United States Patent
Bhatia

[11] Patent Number: 5,959,836
[45] Date of Patent: Sep. 28, 1999

[54] AIRFLOW HEAT EXCHANGER FOR A PORTABLE COMPUTING DEVICE AND DOCKING STATION

[75] Inventor: Rakesh Bhatia, San Jose, Calif.

[73] Assignee: Intel Corporation, Santa Clara, Calif.

[21] Appl. No.: 08/838,980

[22] Filed: Apr. 23, 1997

[51] Int. Cl.⁶ .............................. G06F 1/20; H05K 7/20
[52] U.S. Cl. ..................... 361/687; 361/694; 361/696
[58] Field of Search .................................. 361/686, 687, 361/700, 703, 694, 695, 696, 697; 174/15.2; 165/104.33, 86

[56] References Cited

U.S. PATENT DOCUMENTS

| | | | |
|---|---|---|---|
| 4,710,851 | 12/1987 | Pastecki | 361/687 |
| 5,224,020 | 6/1993 | Golledge et al. | 361/687 |
| 5,255,109 | 10/1993 | Klein . | |
| 5,313,362 | 5/1994 | Hatada et al. | 361/709 |
| 5,412,535 | 5/1995 | Chao et al. | 361/700 |
| 5,424,913 | 6/1995 | Swindler . | |
| 5,427,502 | 6/1995 | Hudson . | |
| 5,430,609 | 7/1995 | Kikinis . | |
| 5,441,576 | 8/1995 | Bierschenk et al. . | |
| 5,475,563 | 12/1995 | Donahoe et al. . | |
| 5,513,070 | 4/1996 | Xie et al. | 361/700 |
| 5,522,712 | 6/1996 | Winn . | |
| 5,550,710 | 8/1996 | Rahamim et al. . | |
| 5,559,673 | 9/1996 | Gagnon et al. | 361/687 X |
| 5,559,675 | 9/1996 | Ksieh et al. . | |
| 5,588,483 | 12/1996 | Ishida | 165/86 |
| 5,598,320 | 1/1997 | Toedtman et al. . | |
| 5,621,613 | 4/1997 | Haley et al. | 361/687 |
| 5,646,822 | 7/1997 | Bhatia et al. | 361/687 |
| 5,694,292 | 12/1997 | Paulsel et al. | 361/686 |

FOREIGN PATENT DOCUMENTS 4-48693  2/1992  Japan ..................... 361/687

Primary Examiner—Lynn D. Feild
Attorney, Agent, or Firm—Jeffrey S. Draeger

[57] ABSTRACT

An air flow heat exchanger for a computing device and a docking station. The heat exchanger includes a first heat exchange duct configured to thermally couple to an electronic component. The first heat exchange duct may be brought into and removed from a mated position with a forced air mechanism. When mated with the forced air mechanism, the forced air mechanism is positioned so as to increase airflow through the first heat exchange duct.

19 Claims, 7 Drawing Sheets

AIRFLOW HEAT EXCHANGER FOR A PORTABLE COMPUTING DEVICE AND DOCKING STATION

FIELD OF THE INVENTION

The present invention pertains to the field of the heat removal from electronic components. More particularly, this invention relates to heat removal from a portable computing device.

BACKGROUND

Faster and more powerful computer components allow the design and construction of higher performance portable computing devices such as laptop or notebook computers. Unfortunately, the use of such faster and more powerful computer components often results in increased heat generation by such computing devices. Thus, improved heat dissipation technology is often needed to maintain operating temperatures of portable computing devices within the same range as their predecessors or some other acceptable range.

A portable computing device typically includes a base and a screen which are rotatably attached by a hinge. The base usually has an input device such as a keyboard or a touchpad as well as a number of electronic components. Integrated circuits with the highest clock frequency are typically located in close proximity to each other within the computer base.

Many heat generating computer system components take the form of integrated circuits. Such integrated circuits are typically mounted on a motherboard or another circuit board within the base the portable computer system. A processor is one component that generates a large amount of heat in a typical processor system. Other electrical components which also generate heat include memory circuits, power supply circuits, and circuit boards such as video card.

Maintaining operating temperatures of computer system components below certain levels is important to ensure performance, reliability, and safety. Most integrated circuits have specified maximum operating temperatures, above which the manufacturer does not recommend operation. Transistors, the building blocks of integrated circuits, tend to slow down as operating temperature increases. Thus, a computer system that operates its integrated circuits close to or beyond recommended timings may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

Since the computer base size is generally kept to a minimum, and the computer base contains both the input device and numerous other electronic components, there may be inadequate space to dissipate enough heat to keep the electronic components within their acceptable range of operating temperatures. Additionally, heat dissipation through the bottom of the base is limited because the computer is usually operated on a relatively flat low conductance surface.

One prior art method for removing heat from the base of a portable computing device involves transferring heat from the base of the device to the display. The technique of transferring heat to the display is limited due to the thermal and mechanical difficulties involved with transferring heat through the hinge of the computing device. Additionally, using this technique, all of the heat is dissipated by the portable computing device.

A docking station is a well known computer attachment that mates with a portable computer to allow the portable computer access to various peripheral devices. Typically, the base of the portable computer plugs into a larger monitor and a full size keyboard. This advantageously allows a portable computer user to operate a portable computing device in a more ergonomic desktop computer setting rather than using a small keyboard and screen as is typically provided in a portable computing device.

The portable computer is often guided into the docking station by alignment rails, and docking pins from the docking station engage a mating connector at the rear of the portable computer. Electrical receptacles from either the docking station or the portable computer engage mating connectors from the other device.

Mating a portable computing device with a docking station often compounds the difficulty of cooling portable computing devices because the display is typically closed. This reduces the natural or passive cooling capability of the portable computing device because convective airflow over the top of the base is mostly blocked by the screen.

The prior art does not take advantage of additional cooling capacity available from components such as a docking station with which a portable computing device may be mated. Particularly, the prior art does not provide a heat dissipation solution which utilizes docking station resources to enhance airflow through the portable computing device.

SUMMARY

An air flow heat exchanger for a portable computing device and a docking station is described. The heat exchanger includes a first heat exchange duct and configured to thermally couple to an electronic component. The first heat exchange duct may be brought into and removed from a mated position with a forced air mechanism. When mated with the forced air mechanism, the forced air mechanism is positioned so as to increase airflow through the first heat exchange duct.

BRIEF DESCRIPTION OF THE FIGURES

The present invention is illustrated by way of example and not limitation in the figures of the accompanying drawings.

DETAILED DESCRIPTION

The present invention provides a heat exchanger for a portable computing device and docking station. In the following description, numerous specific details, such as component types, heat dissipation device sizes, and heat dissipation component mounting structures and locations are set forth in order to provide a more thorough understanding of the present invention. It will be appreciated, however, by one skilled in the art that the invention may be practiced without such specific details.

The present invention provides numerous solutions to remove heat from a portable computing device through a mated docking station. With the ability to remove additional heat through the docking station, it may become possible to operate components such as a processor in a portable computing device at a higher power level by either increasing the supplied voltage, reducing clock throttling, or increasing the operating frequency of the processor. As a result, a portable computing device may be able to obtain higher performance while docked at a docking station.

Figure 1:
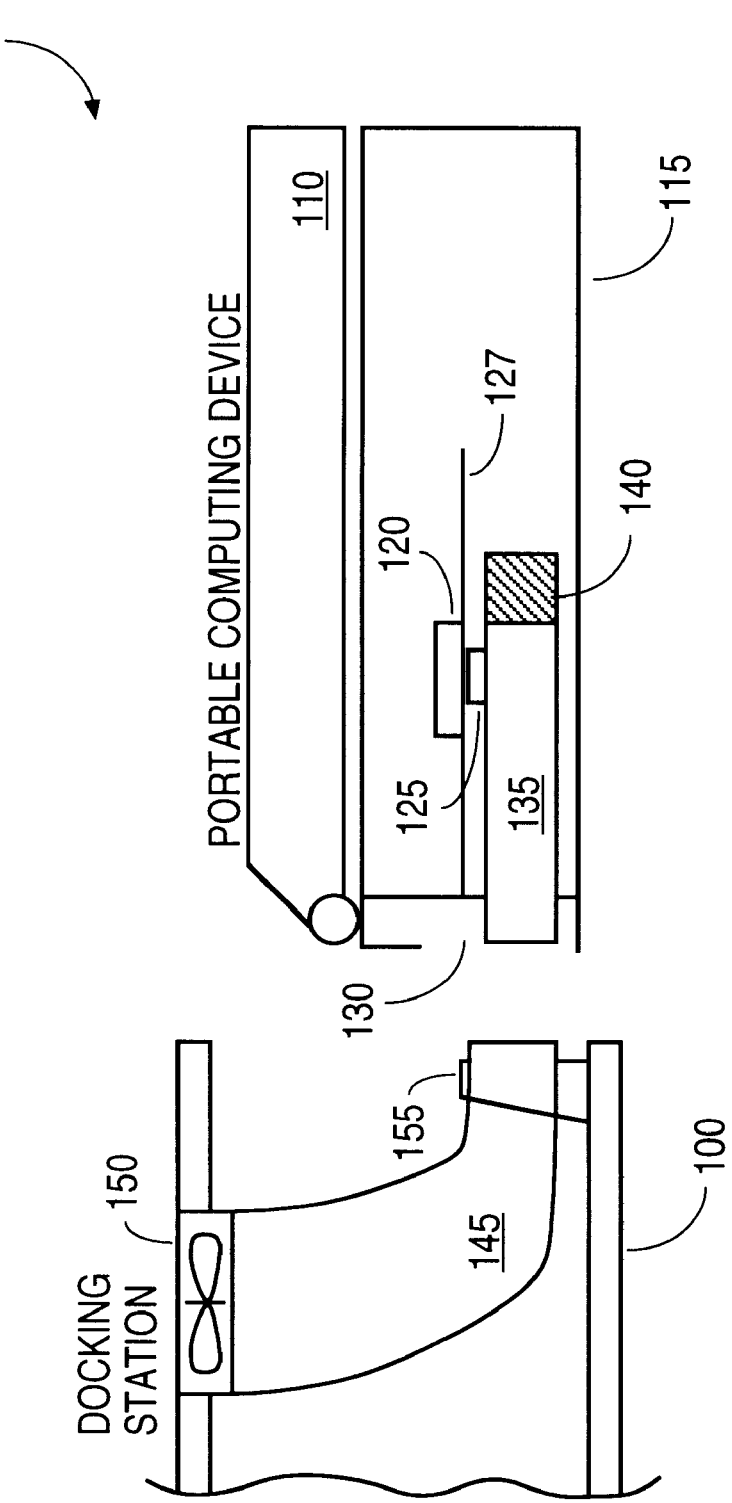
FIG. 1 illustrates an partial cross section elevation view of one embodiment of a portable computing device and a docking station configured according to the present invention.

FIG. 1 illustrates one embodiment of the present invention. A portable computing device 105 may be a laptop computer, a notebook computer, or any other portable computing device which may desire additional cooling capacity when docked at a docking station 100. The portable computing device includes a base 115 and a display 110 hingedly mounted at one edge of the base 115. Additionally, the portable computing device 105 includes an electronic component 120 mounted on a circuit board 127.

In one embodiment, the electronic component 120 is a processor and the circuit board 127 is a motherboard; however, other components or regions of the portable computing device may be cooled according to the present invention. In a typical laptop or notebook computer, many other components are present. A memory system, a disk and/or CD ROM drive, audio and video hardware, connectivity (i.e., network and modem) hardware, as well as a power supply may all be present. These or other individual components as well as circuit boards or regional heat sinks within the portable computing device 105 may be cooled according to the present invention.

A heat transfer element 125 conveys heat away from the electronic component 120 to a first heat exchange duct 135. A vent 140 allows air to easily enter or exit a first end of the heat exchange duct 135. Typically, the vent 140 forms an inlet as cool air is drawn in through the heat exchange duct and warm air is dispelled at the second end of the heat exchange duct. The vent is also typically covered by a protective screen to reduce the intake of dust and particles.

The second end of the duct 135 is positioned at the mating edge of the portable computing device 105 aligned with an aperture 130. In one embodiment, the aperture is mechanically opened, and the second end of the duct 135 exposed, only when the portable computing device 105 and the docking station 100 are in a mated (docked) position. In another embodiment, the second end of the duct 135 may be permanently exposed to continuously allow convective airflow.

In general, the docking station 100 forces air through the portable computing device's heat exchange duct 135 using one of a variety of forced air mechanisms. The forced air mechanism operatively engages the heat exchange duct 135, meaning that it causes an increased airflow, either drawing or blowing air through that duct. The forced air mechanism and the duct need not be intimately mated, but rather may be positioned in close proximity to each other, so long as increased airflow through the duct 135 results. Since the docking station 100 and the portable computing device 105 may be mated and unmated, a removably engaged heat exchange mechanism is formed. As discussed above, higher performance may be obtained from the portable computing device 105 with the additional cooling capacity.

In the embodiment shown in FIG. 1, the forced air mechanism includes a fan 150 and a second heat exchange duct 145. The second heat exchange duct 145 is secured to the housing of the docking station 100 by a mounting element 155. The fan 150 is mounted in the housing of the docking station 100 to provide relatively unencumbered airflow. Air may flow in either direction; however, it is preferable that the fan 150 pull air through the ducts 135 and 145. Additionally, the fan 150 may be mounted in the top, bottom, or either side of the docking station as is convenient in a particular docking station configuration.

Figure 2A:
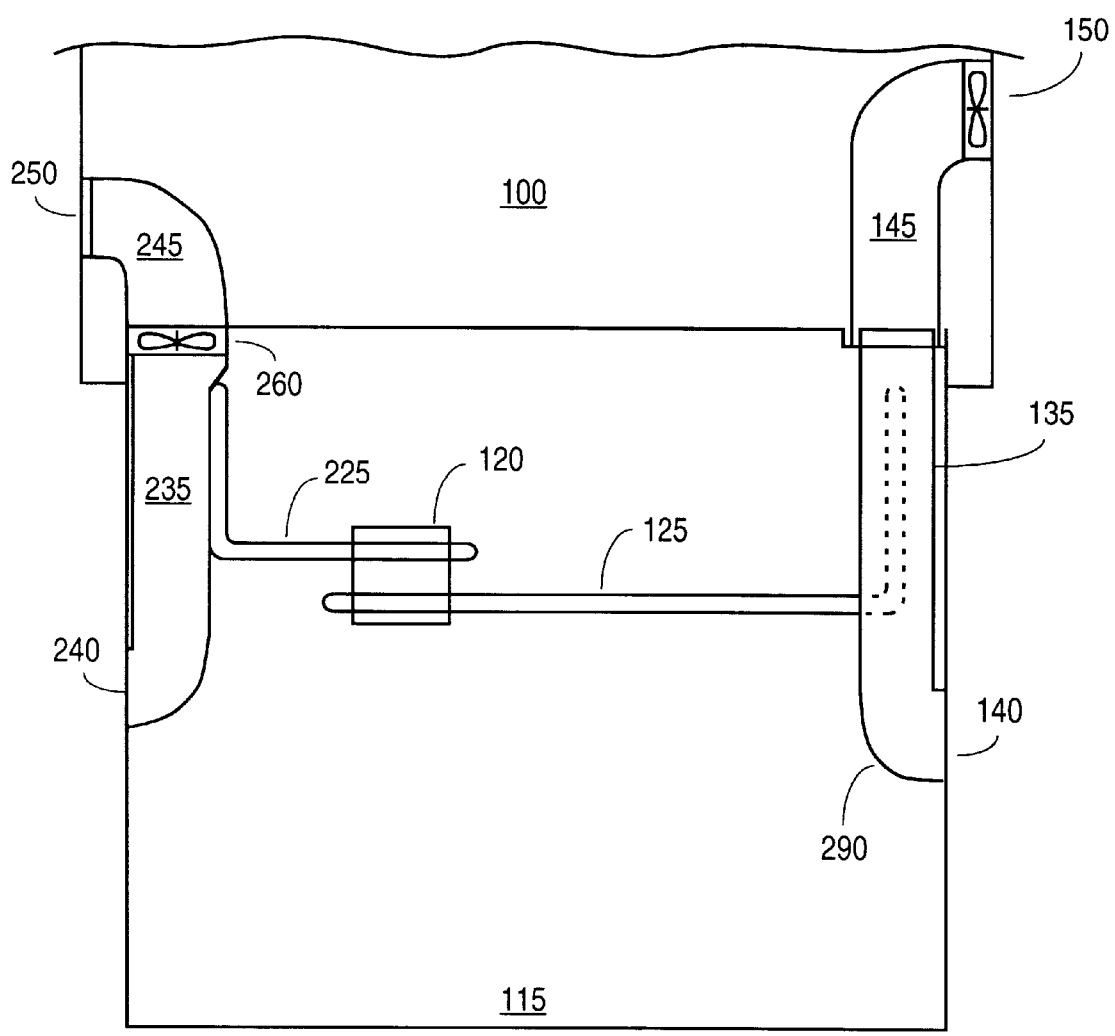
FIGS. 2A and 2B illustrates additional embodiments of a portable computing device and a docking station configured according to the present invention.

FIG. 2A illustrates another embodiment of the present invention. In this embodiment, the docking station 100 accommodates a heat exchange mechanism already within the base 115 and adds additional cooling capacity by adding a second forced air heat exchanger. Often, the second heat exchanger may be much more powerful than that within the base 115 because the fan 150 can be powered by electricity from a power outlet rather than the battery power which is usually required to power mechanisms within the portable computing device 105.

In this embodiment, the existing heat exchange mechanism is a second heat exchange duct 235. A vent 240 is formed in the housing of the base 115 at the first end of the duct 235. A fan 260 at the second end of the duct 235 may be activated as needed during operation of the portable computing device 105 when it is mated with or away from the docking station 100. The fan 260 is typically a relatively small fan, an example being a one inch fan for a laptop computer. When portable computing device 105 and the docking station 100 are mated, a heat exchange duct 245 engages the fan 260, allowing airflow through a vent 250 in the housing of the docking station.

Heat is transferred to the duct 235 by a heat pipe 225 which thermally couples the duct 235 to the electronic component 120. The heat pipe 225 thermally engages the duct 235 by direct contact (e.g., soldering, thermal epoxy, etc.) to an exterior surface. It may be advantageous to solder or epoxy the heat pipe 225 to a plate and then bolt or screw the plate to the duct 235 to simplify disassembly when upgrading the electronic component or other repair is required.

Similarly, in this embodiment, the heat transfer element 125 is a second heat pipe which thermally couples the electronic component 120 to the heat exchange duct 135. The second heat pipe thermally engages the duct 135 by entering the duct such that air directly flows over the heat pipe. Either this technique of thermal engagement or direct or indirect physical contact with the heat pipe is appropriate for either or both ducts.

Additionally, the ducts may be only partially closed and may rely on other components such as a keyboard, a circuit board, or a surface of the housing of the base to assist in channeling air through the duct. Having a duct partially closed may be advantageous during disassembly because the opening in the duct may be positioned to allow removal of the heat pipe through the opening. The ducts may be formed using a thermally conductive material such as aluminum; however, a plastic or other material may be used to save cost or space.

Both vents 140 and 240 are optional as their respective ducts may simply terminate within the base (i.e., without optional curve 290) and draw air through air vents formed throughout the base 115. Eliminating the curve allows the heat pipe to enter the duct at its end and may simplify assembly of the heat pipe/duct combination as well as construction of the duct. Additionally, a combination of distributed vents and larger vents (e.g., vents 140 and 240) may be used.

Figure 2B:
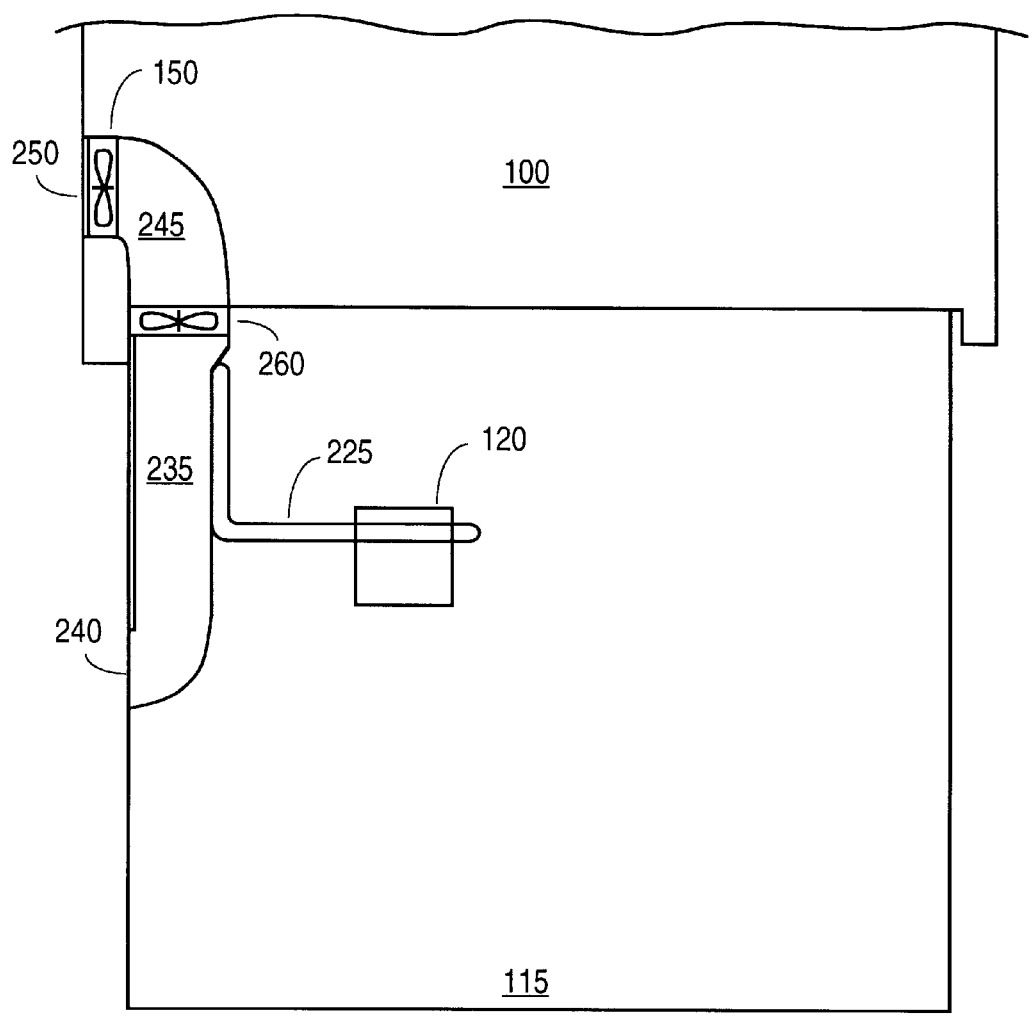

The embodiment of FIG. 2A illustrates the use of parallel fans to cool the electronic component 120. Alternately, as illustrated in FIG. 2B, a serial arrangement of fans may be used. The embodiment of FIG. 2B is similar to that of FIG. 2A except that no second duct is included in the portable computing device 105. Instead, the fan 150 is positioned at the vent 250. Since the fan 150 in the docking station 100 may be significantly more powerful than that in the portable computing device 105, this series fan arrangement improves heat dissipation by forcing more air through the duct 235. In alternate embodiments, the positions of the fans 150 and 260 within their respective ducts and the direction of airflow may be changed.

Figure 3A:
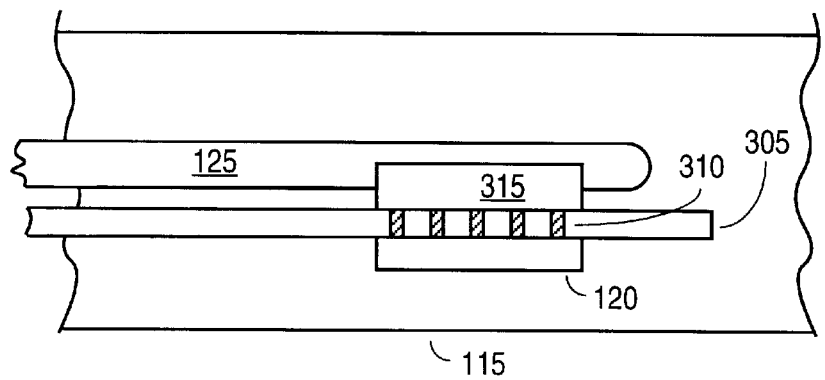
FIGS. 3A–3C illustrate partial cross section elevation views of the connection of a heat transfer element to an electronic component for several embodiments of the present invention.
Figure 3B:
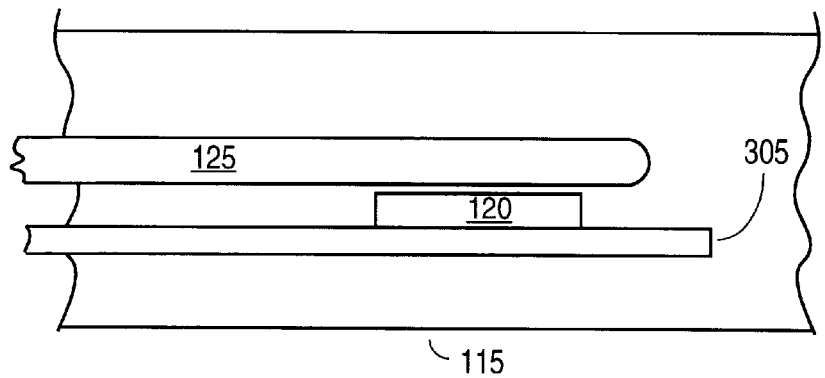

As to the connection of the heat pipe(s) to the electronic component 120, both may be connected by any suitable thermal connection. Several possible connections are shown in FIGS. 3A and 3B. As shown in FIG. 3A, the electronic component is mounted on one side of a motherboard 305 and may be thermally coupled to the heat transfer element 125 via several heat conducting components. In the embodiment of FIG. 3A, the heat conducting components include motherboard vias 310 and a heat conducting block 315. In one embodiment, the block 315 is an aluminum block and the vias 310 are filled with solder. The heat transfer element 125 is affixed to the heat conducting block 315 using solder, thermal epoxy, or other suitable means as are known in the art. This type of mounting may be preferable if the electronic component does not have a rigid package which can withstand a direct connection with the heat transfer element 125.

FIG. 3B illustrates another embodiment in which the heat transfer element 125 is directly mounted on an outer surface of the electronic component 120. The inner surface of the component is affixed to the motherboard 305. Either of these types of connections may be used as well as any other means of thermally coupling the electronic component 120 and the appropriate heat pipe.

Figure 3C:
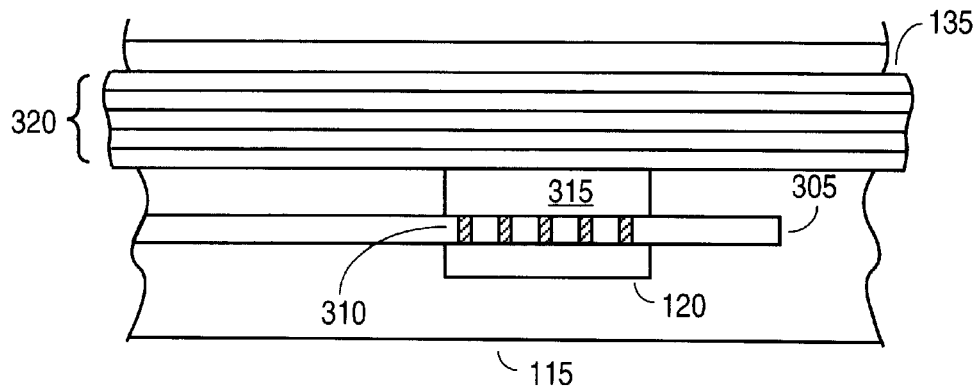

An additional option for thermally coupling the electronic component 120 to the duct 135 is shown in FIG. 3C. In this case, the electronic component 120 is again attached to the motherboard 305 which has thermal vias 310. The thermally conductive block 315, however, is attached directly to the duct 135 which has exterior dissipation fins 320. In some embodiments, the block 315 may need to be specially shaped to reach the duct 135. Additionally, the block 315 may be a large block spread over a region of the motherboard, another circuit board, or a set of components, or it may comprise a series of blocks aligned with the duct 135 (which itself need not be straight). In any case, heat may be transferred from one or more components using one or more heat conductive blocks.

Figure 4A:
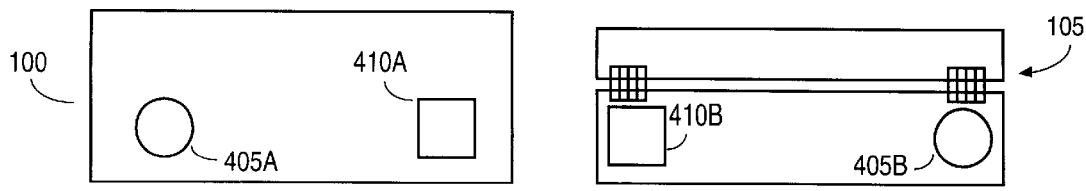
FIGS. 4A–4D illustrate the mating edges of several embodiments of the docking station and portable computing device according to the present invention.

In addition to the numerous possibilities for thermally coupling heat exchange ducts to electronic components, there are many ways to provide enhanced airflow to a portable computing device. FIGS. 4A–4D illustrate several embodiments which allow a forced air mechanism in a docking station to operatively engage one or more ducts or airflow channels in a portable computing device. FIG. 4A illustrates an embodiment appropriate for use with the embodiment illustrated in FIG. 2A which includes two heat exchange ducts. A pair of circular mating apertures 405$a$ and 405$b$ and a pair of square mating apertures 410$a$ and 410$b$ allow improved airflow between the portable computing device 105 and the docking station 100. This arrangement may be particularly appropriate where the square aperture 410$b$ includes a fan such as the fan 260 in FIG. 2A.

Figure 4B:
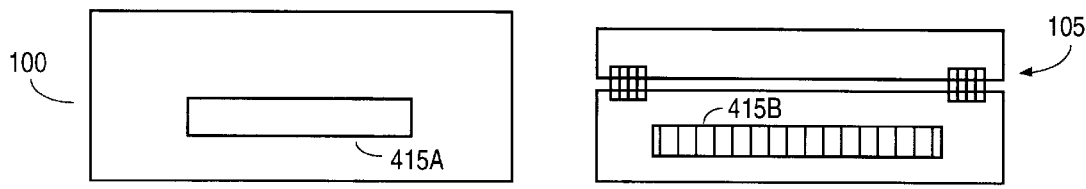

FIG. 4B illustrates the use of a pair of rectangular apertures 415$a$ and 415$b$. The rectangular aperture 415$b$ may comprise a grill formed in the housing of the portable computer 105. As an alternative, air may be drawn (or blown) through existing grilled surfaces of the portable computer 105 rather than designating a particular region as an aperture since the housing for such portable devices is often vented to facilitate airflow.

Figure 4C:
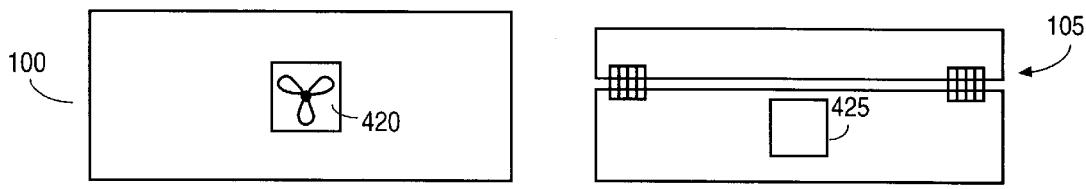
Figure 4D:
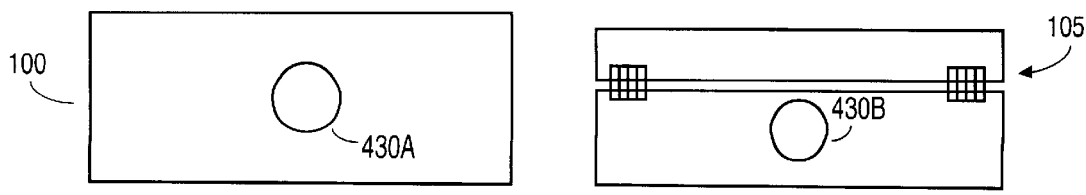

FIG. 4C illustrates an embodiment where a fan 420 in the docking station 100 is aligned with a square aperture 425 in the portable computing device 105. In FIG. 4D, a pair of circular apertures 430$a$ and 430$b$ are used. With the central locations of the apertures 425$b$ and 430$b$, the ducts extending from these apertures may pass directly over electronic components which may benefit from cooling, making the thermal engagement technique shown in FIG. 3C appropriate.

Figure 5A:
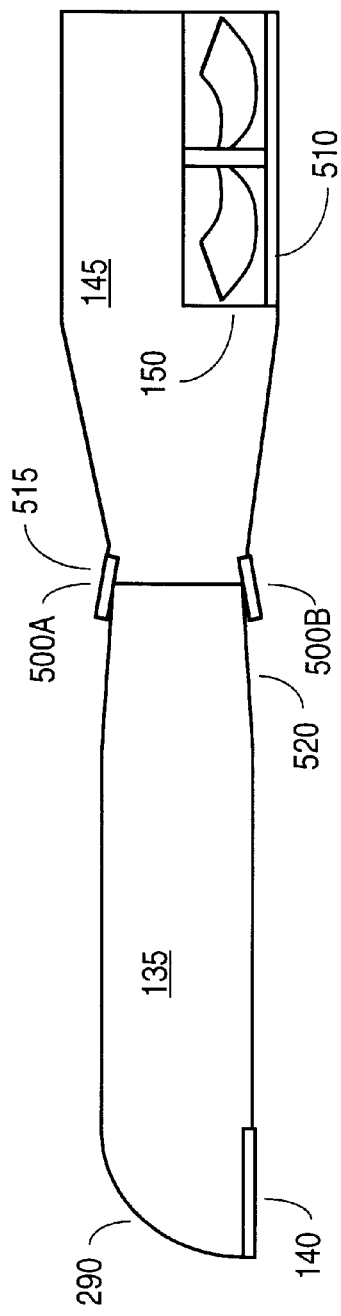
FIGS. 5A and 5B illustrate two embodiments of engaged heat exchange ducts according to the present invention.
Figure 5B:
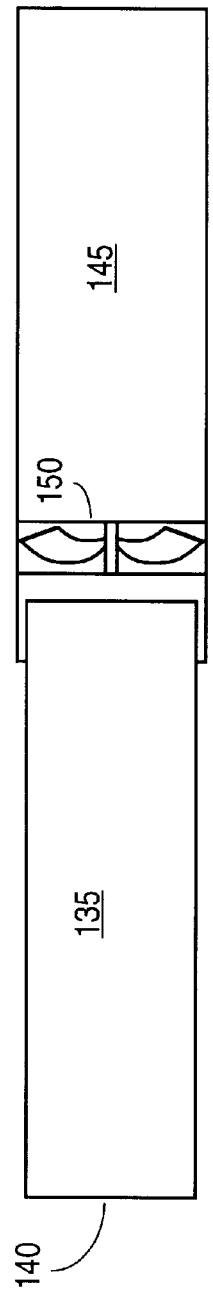

FIGS. 5A and 5B illustrate two examples of the cooperative engagement of the heat exchange ducts 135 and 145. Other known duct engaging techniques may also be used. In FIG. 5A, the duct 135 includes the optional curve and the vent 140 at one end. A tapered end 520 is engaged by a flared end 515 of the duct 145. Seals 500$a$ and 500$b$ made of rubber or a similar compressably conforming material may be used to reduce air leakage. Also illustrated in FIG. 5A is a screen 510 preventing objects from contacting the fan 150 which is mounted at the opposite end of the duct 145 from the flared end 515.

FIG. 5B illustrates an embodiment where the fan 150 is mounted near the engaging end of the duct 145. This embodiment illustrates both the duct 135 and the duct 145 being substantially straight. The ducts may be either cylindrical, square, or rectangular. Also illustrated in FIG. 5B is the vent 140 being located at a straight termination of the duct 135, as opposed to being located after a curve leading to the housing of the portable computing device. In some embodiments, this straight termination results in air moved by the fan passing through grills or vents located throughout the housing of the portable computing device.

Figure 6A:
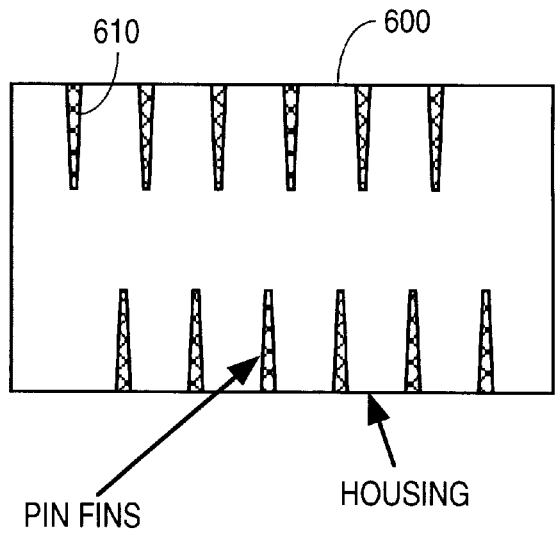
FIGS. 6A–6C illustrate several embodiments of fin structures which may be used with heat exchange ducts in accordance with the present invention.
Figure 6B:
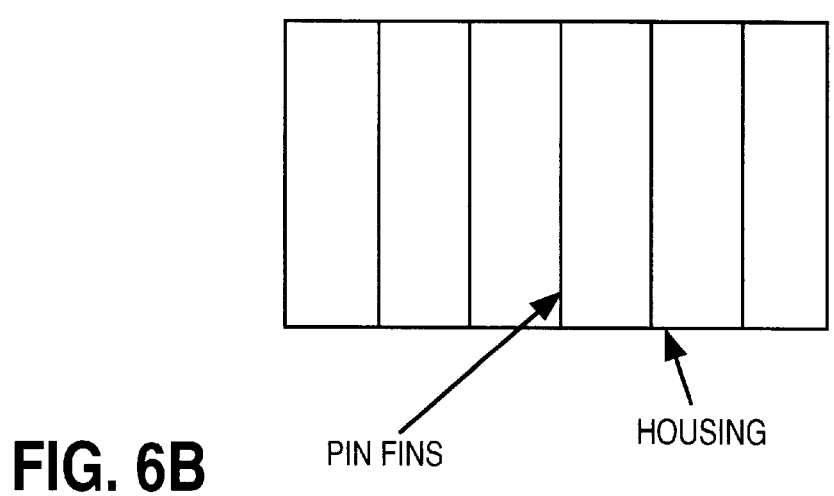
Figure 6C:
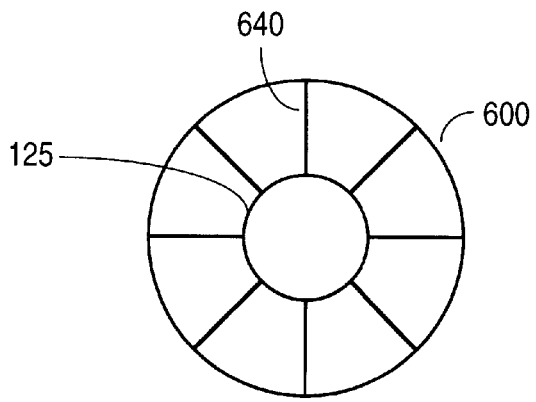

Finally, FIGS. 6A–6C illustrate a variety of heat dissipation fins which may be used within the ducts 135 and/or 145. FIG. 6A illustrates an embodiment having a plurality of pin fins 610 attached to the interior walls of the duct housing 600. FIG. 6B illustrates the use of plate fins 630 extending from one side of the duct housing 600 to the opposite side. FIG. 6C illustrates a cylindrical duct having a portion of the heat transfer element 125 (e.g., a heat pipe) substantially enclosed in the duct housing 600. Radially affixed longitudinal fins 640 extend radially from the heat transfer element 125 and may or may not reach the duct housing 600 in different embodiments. These fin structures serve as examples, and other structures known in the art may be employed as well.

Thus, the present invention provides a number of air flow heat exchanger solutions for a portable computing device and a docking station. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A heat exchange apparatus comprising:
   a first heat exchange duct;
   a heat transfer element having a first portion thermally engaging an electronic component and a second portion connected to the first heat exchange duct; and
   a forced air mechanism removably positioned to increase airflow through the first heat exchange duct when the heat exchange apparatus is in a mated position.

2. The heat exchange apparatus of claim 1 wherein the forced air mechanism is a fan which is positioned adjacent to the heat exchange duct when the heat exchange apparatus is in the mated position.

3. The heat exchange apparatus of claim 1 wherein the forced air mechanism comprises:
   a fan;
   a second heat exchange duct having a first end connected to the fan and a second end positioned to operatively engage the first heat exchange duct when the heat exchange apparatus is in the mated position.

4. An apparatus comprising:
   a computing device comprising:
      a base containing an electronic component;
      a first heat exchange duct thermally coupled to the electronic component and having a first end positioned at a mating edge of the computing device;
      a heat transfer element having a first portion thermally engaging an electronic component and a second portion connected to the first heat exchange duct; and
   a docking station comprising:
      a housing having a mating end adapted to mate with the computing device; and
      a fan attached to the housing, the fan being positioned to cause an increase in air flow through the first heat exchange duct when the docking station and the computing device are in a mated position.

5. The apparatus of claim 4 wherein the docking station further comprises:
   a second heat exchange duct having a first end connected to the fan and a second end positioned adjacent to the first end of the first heat exchange duct when the docking station and the computing device are in the mated position.

6. The apparatus of claim 5 wherein the heat transfer element comprises a heat pipe.

7. The apparatus of claim 6 wherein the second portion of the heat transfer element is positioned inside the first heat exchange duct.

8. The apparatus of claim 6 wherein the second portion of the heat transfer element is positioned inside the first heat exchange duct.

9. The apparatus of claim 8 wherein the second portion of the heat pipe has radially affixed longitudinal heat dissipation fins.

10. The apparatus of claim 6 wherein the computing device further comprises:
    a third heat exchange duct attached to the base and having a second fan located at a first duct end; and
    a second heat pipe having a first portion thermally coupled to the electronic component and a second portion thermally coupled to the third heat exchange duct.

11. The apparatus of claim 4 wherein the electronic component is a motherboard.

12. The apparatus of claim 4 wherein the first heat exchange duct is attached to the electronic component by a heat conductive block.

13. The apparatus of claim 6 wherein the electronic component is a processor.

14. The apparatus of claim 13 wherein the processor is thermally coupled to the heat pipe by at least one heat conductive component.

15. The apparatus of claim 5 wherein the first end of the first heat exchange duct and the second end second heat exchange duct are cooperatively engaged when the docking station and the computing device are in the mated position.

16. The apparatus of claim 15 wherein first end of the first heat exchange duct and the second end second heat exchange duct comprise a tapered duct end and a flared duct end, the tapered duct end and the flared duct end being cooperatively engaged when the docking station and the computing device are in the mated position.

17. An apparatus comprising:
    a computing device comprising:
       a base containing an electronic component;
       a first heat exchange duct thermally coupled to the electronic component and having a first end positioned at a mating edge of the computing device;
       a heat transfer element thermally coupling the electronic component to the first heat exchange duct;
    a docking station comprising:
       a housing having a mating end adapted to mate with the computing device;
       a fan attached to the housing, the fan being positioned to cause an increase in air flow through the first heat exchange duct when the docking station and the computing device are in a mated position; and
       a second heat exchange duct having a first end connected to an air inlet disposed in the housing of the docking station and a second end positioned adjacent to the first end of the first heat exchange duct when the docking station and the computing device are in the mated position, the fan being positioned at the second end of the second heat exchange duct.

18. An apparatus comprising:
    a first air flow heat transfer means for channeling heat from within a computer housing to without the computer housing via air flow;
    a means for conveying heat from an electronic component to the first air flow heat transfer means, the means for conveying heat having a first portion thermally engaging the electronic component and a second portion connected to the first air flow heat transfer means; and
    a forced air heat transfer means for removably operatively engaging the first air flow heat transfer means and forcing air through the first air flow heat transfer means when the first air flow heat transfer means and the forced air heat transfer means are in a mated position.

19. The apparatus of claim 18 wherein the forced air heat transfer means comprises:

a second air flow heat transfer means in a second computer housing for operatively engaging the first air flow heat transfer means and transferring heat from said first air flow heat transfer means to outside of the second housing when the first air flow heat transfer means and the forced air heat transfer means are in a mated position; and a fan means attached at an end of the second air flow heat transfer means.

\* \* \* \* \*